(12) United States Patent
Sen et al.

(10) Patent No.: US 10,941,706 B2
(45) Date of Patent: Mar. 9, 2021

(54) CLOSED CYCLE HEAT ENGINE FOR A GAS TURBINE ENGINE

(71) Applicant: General Electric Company, Schenectady, NY (US)

(72) Inventors: Arnab Sen, Bangalore (IN); Brandon Wayne Miller, Liberty Township, OH (US); Bhaskar Nanda Mondal, Bangalore (IN); Kishanjit Pal, Bangalore (IN); Daniel Alan Niergarth, Norwood, OH (US)

(73) Assignee: General Electric Company, Schenectady, NY (US)

( * ) Notice: Subject to any disclaimer, the term of this patent is extended or adjusted under 35 U.S.C. 154(b) by 260 days.

(21) Appl. No.: 15/895,336

(22) Filed: Feb. 13, 2018

(65) Prior Publication Data

US 2019/0249599 A1 Aug. 15, 2019

(51) Int. Cl.
*F02C 6/18* (2006.01)
*F02C 3/04* (2006.01)
(Continued)

(52) U.S. Cl.
CPC .............. *F02C 6/18* (2013.01); *F01K 25/103* (2013.01); *F02C 1/10* (2013.01); *F02C 3/04* (2013.01);
(Continued)

(58) Field of Classification Search
CPC .... F02C 6/18; F02C 3/107; F02C 7/32; F02C 7/36; F02C 1/10; F01K 25/103
See application file for complete search history.

(56) References Cited

U.S. PATENT DOCUMENTS

| | | |
|---|---|---|
| 2,582,842 A | 1/1952 | Messinger |
| 3,164,955 A | 1/1965 | Garraway |
| (Continued) | | |

FOREIGN PATENT DOCUMENTS

| | | |
|---|---|---|
| EP | 1609954 A1 | 12/2005 |
| EP | 1798381 A2 | 6/2007 |
| (Continued) | | |

OTHER PUBLICATIONS

Wright et al., Workshop on New Cross-cutting Technologies for Nuclear Power Plants, SuperCritical Technologies, MIT: Cambridge, MA, Jan. 30-31, 2017, 25 pages; https://energy.mit.edu/wp-content/uploads/2017/02/2-5.-U-Wisc-SCT-MIT_slides_V4b-min.pdf.

(Continued)

*Primary Examiner* — Todd E Manahan
*Assistant Examiner* — Katheryn A Malatek
(74) *Attorney, Agent, or Firm* — Dority & Manning, P.A.

(57) ABSTRACT

An aeronautical gas turbine engine includes a turbomachine including a compressor section, a combustion section, a turbine section, and an exhaust section in serial flow order. The aeronautical gas turbine engine additionally includes a closed cycle heat engine including a compressor configured to compress a working fluid; a primary heat exchanger in thermal communication with the turbomachine and the working fluid, the primary heat exchanger configured to transfer heat from the turbomachine to the working fluid; an expander coupled to the compressor for expanding the working fluid; and an output shaft driven by the expander.

20 Claims, 6 Drawing Sheets

(51) Int. Cl.
- *F02C 7/18* (2006.01)
- *F02K 3/02* (2006.01)
- *F01K 25/10* (2006.01)
- *F02C 1/10* (2006.01)

(52) U.S. Cl.
CPC .............. *F02C 7/18* (2013.01); *F02K 3/02* (2013.01); *F05D 2210/20* (2013.01); *F05D 2220/323* (2013.01); *F05D 2220/62* (2013.01); *F05D 2220/76* (2013.01); *F05D 2260/213* (2013.01)

(56) References Cited

U.S. PATENT DOCUMENTS

| | | |
|---|---|---|
| 3,557,554 A | 1/1971 | Martinek et al. |
| 3,621,654 A | 11/1971 | Hull |
| 3,769,789 A | 11/1973 | Niggemann |
| 3,895,243 A | 7/1975 | Amend et al. |
| 4,229,944 A | 10/1980 | Weiler |
| 4,317,646 A | 3/1982 | Steel et al. |
| 4,505,124 A | 3/1985 | Mayer |
| 4,525,998 A | 7/1985 | Schwarz |
| 4,550,573 A | 11/1985 | Rannenberg |
| 4,773,212 A | 9/1988 | Griffin et al. |
| 4,826,397 A | 5/1989 | Shook et al. |
| 4,928,240 A | 5/1990 | Davison et al. |
| 4,991,394 A | 2/1991 | Wright |
| 5,012,420 A | 4/1991 | Walker et al. |
| 5,149,018 A | 9/1992 | Clark |
| 5,174,714 A | 12/1992 | Plemmons et al. |
| 5,181,559 A | 1/1993 | Svoboda |
| 5,341,636 A | 8/1994 | Paul |
| 5,399,066 A | 3/1995 | Ritchie et al. |
| 5,452,573 A | 9/1995 | Glickstein et al. |
| 5,667,168 A | 9/1997 | Fluegel |
| 5,722,241 A | 3/1998 | Huber |
| 5,724,806 A | 3/1998 | Horner |
| 5,730,088 A | 3/1998 | Foley et al. |
| 5,899,660 A | 5/1999 | Dodd |
| 6,106,229 A | 8/2000 | Nikkanen et al. |
| 6,182,435 B1 | 2/2001 | Niggemann et al. |
| 6,224,328 B1 | 5/2001 | Weigand et al. |
| 6,250,097 B1 | 6/2001 | Lui et al. |
| 6,415,595 B1 | 7/2002 | Wilmot, Jr. et al. |
| 6,435,454 B1 | 8/2002 | Engelhardt |
| 6,701,717 B2 | 3/2004 | Flatman et al. |
| 6,817,189 B2 | 11/2004 | Boeck |
| 6,974,306 B2 | 12/2005 | Djeridane et al. |
| 7,254,937 B2 | 8/2007 | Hull et al. |
| 7,254,951 B2 | 8/2007 | Lockwood, Jr. |
| 7,260,926 B2 | 8/2007 | Sabatino et al. |
| 7,377,098 B2 | 5/2008 | Walker et al. |
| 7,398,641 B2 | 7/2008 | Stretton et al. |
| 7,491,029 B2 | 2/2009 | Pezzetti, Jr. et al. |
| 7,503,179 B2 | 3/2009 | Estridge et al. |
| 7,597,537 B2 | 10/2009 | Bucaro et al. |
| 7,681,339 B2 | 3/2010 | Orlando et al. |
| 7,823,389 B2 | 11/2010 | Seitzer et al. |
| 7,836,680 B2 | 11/2010 | Schwarz et al. |
| 7,882,704 B2 | 2/2011 | Chen |
| 7,946,806 B2 | 5/2011 | Murphy |
| 7,966,807 B2 | 6/2011 | Norris et al. |
| 7,987,676 B2 | 8/2011 | Ast et al. |
| 8,056,345 B2 | 11/2011 | Norris et al. |
| 8,126,628 B2 | 2/2012 | Hershey et al. |
| 8,162,593 B2 | 4/2012 | Guimbard et al. |
| 8,177,884 B2 | 5/2012 | Schmidt et al. |
| 8,205,426 B2 | 6/2012 | Schilling |
| 8,261,528 B2 | 9/2012 | Chillar et al. |
| 8,266,888 B2 | 9/2012 | Liu |
| 8,307,662 B2 | 11/2012 | Turco |
| 8,342,798 B2 | 1/2013 | Floyd, II et al. |
| 8,371,127 B2 | 2/2013 | Durocher et al. |
| 8,434,997 B2 | 5/2013 | Pinero et al. |
| 8,438,835 B2 | 5/2013 | Perveiler et al. |
| 8,459,040 B2 | 6/2013 | Glahn et al. |
| 8,490,382 B2 | 7/2013 | Zysman et al. |
| 8,499,822 B2 | 8/2013 | Bulin et al. |
| 8,522,572 B2 | 9/2013 | Coffinbeny et al. |
| 8,689,538 B2 | 4/2014 | Sankrithi et al. |
| 8,756,910 B2 | 6/2014 | Donovan et al. |
| 8,763,363 B2 | 7/2014 | Ranganathan |
| 8,765,070 B2 | 7/2014 | Norton et al. |
| 8,776,952 B2 | 7/2014 | Schwarz et al. |
| 8,783,040 B2 | 7/2014 | Erickson et al. |
| 8,789,377 B1 | 7/2014 | Brostmeyer |
| 8,858,161 B1 | 10/2014 | Ryznic et al. |
| 8,881,397 B1 | 11/2014 | Dowd |
| 8,899,008 B2 | 12/2014 | Jones et al. |
| 8,944,367 B2 | 2/2015 | Bystry, Jr. et al. |
| 8,961,114 B2 | 2/2015 | Ruthemeyer |
| 8,978,353 B2 | 3/2015 | Norton et al. |
| 8,984,884 B2 | 3/2015 | Xu et al. |
| 8,998,563 B2 | 4/2015 | Rioux |
| 9,004,853 B2 | 4/2015 | Puerta et al. |
| 9,014,791 B2 | 4/2015 | Held |
| 9,038,397 B2 | 5/2015 | Papa et al. |
| 9,079,803 B2 | 7/2015 | Xu |
| 9,109,608 B2 | 8/2015 | Little et al. |
| 9,120,580 B2 | 9/2015 | Sampath |
| 9,212,623 B2 | 12/2015 | Murphy et al. |
| 9,243,563 B2 | 1/2016 | Lo |
| 9,260,974 B2 | 2/2016 | Hasting et al. |
| 9,297,391 B2 | 3/2016 | Rued et al. |
| 9,341,074 B2 | 5/2016 | Schimmels et al. |
| 9,410,482 B2 | 8/2016 | Krautheim et al. |
| 9,422,063 B2 | 8/2016 | Diaz |
| 9,453,434 B2 | 9/2016 | Tanimura et al. |
| 9,567,095 B2 | 2/2017 | McCarthy et al. |
| 9,580,185 B2 | 2/2017 | Rhoden et al. |
| 9,587,561 B2 | 3/2017 | Snyder et al. |
| 9,611,744 B2 | 4/2017 | Taylor |
| 9,752,462 B1 | 9/2017 | Fletcher |
| 9,776,727 B2 | 10/2017 | Ellis et al. |
| 2007/0086887 A1 | 4/2007 | Pezzetti, Jr. et al. |
| 2009/0133380 A1 | 5/2009 | Donnerhack |
| 2009/0188234 A1 | 7/2009 | Suciu et al. |
| 2010/0313591 A1 | 12/2010 | Lents et al. |
| 2011/0027068 A1 | 2/2011 | Floyd, II et al. |
| 2011/0171007 A1 | 7/2011 | Johnson et al. |
| 2012/0128467 A1 | 5/2012 | Ruthemeyer |
| 2012/0216502 A1 | 8/2012 | Freund et al. |
| 2013/0015609 A1 | 1/2013 | Landau |
| 2013/0098046 A1* | 4/2013 | Suciu .............. F02C 7/08 60/772 |
| 2013/0186100 A1 | 7/2013 | Rhoden et al. |
| 2013/0233526 A1 | 9/2013 | Hislop |
| 2013/0280081 A1 | 10/2013 | Propheter-Hinckley et al. |
| 2013/0302154 A1 | 11/2013 | Finlayson |
| 2014/0030066 A1 | 1/2014 | Schimmels et al. |
| 2014/0119881 A1* | 5/2014 | Kalra .............. F01D 11/04 415/1 |
| 2014/0150443 A1* | 6/2014 | Laing .............. F01K 23/103 60/774 |
| 2014/0161601 A1 | 6/2014 | Geiger |
| 2014/0165570 A1 | 6/2014 | Herring |
| 2014/0205446 A1 | 7/2014 | Patsouris et al. |
| 2014/0216042 A1 | 8/2014 | Hanson |
| 2014/0260340 A1* | 9/2014 | Vaisman .............. B64D 13/06 62/56 |
| 2014/0321984 A1 | 10/2014 | Welch et al. |
| 2014/0345254 A1 | 11/2014 | Dawson et al. |
| 2014/0345292 A1 | 11/2014 | Diaz et al. |
| 2015/0000291 A1 | 1/2015 | Smith et al. |
| 2015/0040986 A1 | 2/2015 | Tichborne et al. |
| 2016/0108814 A1 | 4/2016 | Schmitz |
| 2016/0131035 A1 | 5/2016 | Diaz et al. |
| 2016/0131036 A1 | 5/2016 | Bintz et al. |
| 2016/0178285 A1 | 6/2016 | Pal et al. |
| 2016/0186606 A1 | 6/2016 | Blaney et al. |
| 2016/0195017 A1 | 7/2016 | Vick |
| 2016/0201989 A1 | 7/2016 | Martinez et al. |
| 2016/0265393 A1 | 9/2016 | Fleszar |
| 2016/0290214 A1 | 10/2016 | Ekanayake et al. |

(56) References Cited

U.S. PATENT DOCUMENTS

| | | |
|---|---|---|
| 2016/0290233 A1 | 10/2016 | Ekanayake et al. |
| 2016/0312702 A1 | 10/2016 | Thomas |
| 2016/0326915 A1 | 11/2016 | Baladi |
| 2016/0369700 A1 | 12/2016 | Ribarov et al. |
| 2016/0369706 A1 | 12/2016 | Suciu et al. |
| 2017/0030266 A1 | 2/2017 | Cerny et al. |
| 2017/0033641 A1 | 2/2017 | Pera et al. |
| 2017/0114667 A1 | 4/2017 | Sabo et al. |
| 2017/0114721 A1 | 4/2017 | Miller et al. |
| 2017/0122210 A1 | 5/2017 | Schwarz et al. |
| 2017/0138372 A1 | 5/2017 | Subramanian et al. |
| 2017/0159566 A1 | 6/2017 | Sennoun et al. |
| 2017/0159675 A1 | 6/2017 | Sennoun et al. |
| 2017/0167382 A1 | 6/2017 | Miller et al. |
| 2017/0175563 A1 | 6/2017 | Chaudhari et al. |
| 2017/0184024 A1 | 6/2017 | Sennoun |
| 2017/0204807 A1 | 7/2017 | Chillapalli et al. |
| 2017/0254229 A1 | 9/2017 | Fletcher |

FOREIGN PATENT DOCUMENTS

| | | |
|---|---|---|
| EP | 3018304 A1 | 5/2016 |
| GB | 2136880 A | 9/1984 |
| GB | 2204361 A | 11/1988 |
| JP | S5932893 U | 2/1984 |
| WO | WO 02/16743 A1 | 2/2002 |
| WO | WO2002/038938 A1 | 5/2002 |
| WO | WO2006/079438 A1 | 8/2006 |
| WO | WO2011/038188 A1 | 3/2011 |
| WO | WO2014/051678 A1 | 4/2014 |
| WO | WO2015/012911 A2 | 1/2015 |
| WO | WO2015/069145 A1 | 5/2015 |

OTHER PUBLICATIONS

U.S. Appl. No. 15/368,227, filed Dec. 2, 2016.
U.S. Appl. No. 15/796,991, filed Oct. 31, 2017.
U.S. Appl. No. 15/819,443, filed Nov. 21, 2017.
U.S. Appl. No. 15/819,327, filed Nov. 21, 2017.
U.S. Appl. No. 15/861,802, filed Jan. 4, 2018.

* cited by examiner

CLOSED CYCLE HEAT ENGINE FOR A GAS TURBINE ENGINE

FIELD

The present subject matter relates generally to a gas turbine engine, and more specifically to a gas turbine engine including a closed cycle heat engine.

BACKGROUND

A gas turbine engine typically includes a fan and a turbomachine. The turbomachine generally includes an inlet, one or more compressors, a combustor, and at least one turbine. The compressors compress air which is channeled to the combustor where it is mixed with fuel. The mixture is then ignited for generating hot combustion gases. The combustion gases are channeled to the turbine(s) which extracts energy from the combustion gases for powering the compressor(s), as well as for producing useful work to propel an aircraft in flight and/or to power a load, such as an electrical generator.

During operation of the gas turbine engine, various systems may generate a relatively large amount of heat. In at least certain operations, all or a portion of such heat may not be utilized for useful work. The failure to utilize such heat for useful work may result in a less efficient gas turbine engine. Accordingly, gas turbine engine having the ability to more completely utilize such heat would be useful.

BRIEF DESCRIPTION

Aspects and advantages of the invention will be set forth in part in the following description, or may be obvious from the description, or may be learned through practice of the invention.

In one exemplary embodiment of the present disclosure, an aeronautical gas turbine engine is provided. The aeronautical gas turbine engine includes a turbomachine including a compressor section, a combustion section, a turbine section, and an exhaust section in serial flow order. The aeronautical gas turbine engine additionally includes a closed cycle heat engine including a compressor configured to compress a working fluid; a primary heat exchanger in thermal communication with the turbomachine and the working fluid, the primary heat exchanger configured to transfer heat from the turbomachine to the working fluid; an expander coupled to the compressor for expanding the working fluid; and an output shaft driven by the expander.

In certain exemplary embodiments the closed cycle heat engine further includes an engine sink heat exchanger in thermal communication with a heat sink and the working fluid, the engine sink heat exchanger configured to transfer heat from the working fluid to the heat sink.

For example, in certain exemplary embodiments the aeronautical gas turbine engine further includes an outer nacelle at least partially surrounding the turbomachine and defining at least in part a bypass airflow path, wherein the heat sink is the bypass airflow path and the engine sink heat exchanger is positioned within, or exposed to, the bypass airflow path.

For example, in certain exemplary embodiments the primary heat exchanger is positioned downstream of the compressor of the closed cycle heat engine and upstream of the expander of the closed cycle heat engine, and wherein the engine sink heat exchanger is positioned downstream of the expander of the closed cycle heat engine and upstream of the compressor of the closed cycle heat engine.

In certain exemplary embodiments the closed cycle heat engine further includes an intermediate heat exchanger in thermal communication with the working fluid at an upstream location and at a downstream location, wherein the upstream location is positioned upstream of the expander and the downstream location positioned downstream of the expander, the intermediate heat exchanger configured to transfer heat from the working fluid at the downstream location to the working fluid at the upstream location.

For example, in certain exemplary embodiments the upstream location is between the compressor and the primary heat exchanger.

In certain exemplary embodiments the turbomachine further includes a cooling air system for providing cooling airflow from the compressor section to the turbine section and a main lubrication system, and wherein the primary heat exchanger is in thermal communication with at least one of the turbine section, the exhaust section, the cooling air system, or the main lubrication system.

For example, in certain exemplary embodiments the primary heat exchanger is directly in thermal communication with at least one of the turbine section, the exhaust section, the cooling air system, or the main lubrication system.

In certain exemplary embodiments the aeronautical gas turbine engine further includes an intermediate thermal transfer system including a thermal bus and a heat source heat exchanger, wherein the heat source heat exchanger of the intermediate thermal transfer system is directly in thermal communication with a heat source of the turbomachine and the thermal bus, and wherein the intermediate thermal transfer system is configured to transfer heat from the heat source heat exchanger, through the thermal bus, to the primary heat exchanger of the closed cycle heat engine.

In certain exemplary embodiments the output shaft of the closed cycle heat engine is configured for adding power to the turbomachine.

In certain exemplary embodiments the aeronautical gas turbine engine further includes an accessory gearbox mechanically coupled to one or more components of the turbomachine, wherein the output shaft of the closed cycle heat engine is mechanically coupled to the accessory gearbox for adding power to the accessory gearbox.

In certain exemplary embodiments the closed cycle heat engine further includes an electric machine, wherein the output shaft is drivingly coupled to the electric machine for driving the electric machine and generating electrical power.

The gas turbine engine of claim 12, wherein the turbomachine includes an electric machine electrically coupled to the electric machine of the closed cycle heat engine.

In certain exemplary embodiments the closed cycle heat engine defines a hermetically sealed recirculating flowpath through at least the compressor, the primary heat exchanger, and the expander.

In certain exemplary embodiments the working fluid is a supercritical carbon dioxide.

In another exemplary embodiment, a gas turbine engine is provided. The exemplary gas turbine engine includes a turbomachine and a closed cycle heat engine. The closed cycle heat engine includes a compressor configured to compress a working fluid; a primary heat exchanger in thermal communication with the turbomachine and the working fluid, the primary heat exchanger configured to transfer heat from the turbomachine to the working fluid; an expander coupled to the compressor for expanding the working fluid; and an output shaft driven by the expander. The gas turbine engine further includes a means for receiving power from the output shaft of the closed cycle heat engine and providing at least a portion of such power to the turbomachine.

In certain exemplary embodiments the means for receiving power from the output shaft and providing at least a portion of such power to the turbomachine is an accessory gearbox, wherein the output shaft of the closed cycle heat engine is mechanically coupled to the accessory gearbox, and wherein the accessory gearbox is mechanically coupled to one or more components of the turbomachine.

In certain exemplary embodiments the turbomachine includes a compressor section, a turbine section, and a shaft mechanically coupled to a component of the compressor section and a component of the turbine section, wherein the means for receiving power from the output shaft and providing at least a portion of such power to the turbomachine is an electric generator and an electric motor, wherein the electric generator is configured to be driven by the output shaft of the closed cycle heat engine, and wherein the electric motor is mechanically coupled to the shaft and electrically coupled to the electric generator for adding power to the shaft using electrical power received from the electric generator.

In certain exemplary embodiments the closed cycle heat engine further includes an engine sink heat exchanger in thermal communication with a heat sink and the working fluid, the engine sink heat exchanger configured to transfer heat from the working fluid to the heat sink.

In certain exemplary embodiments the gas turbine engine is an aeronautical gas turbine engine.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Figure 1:
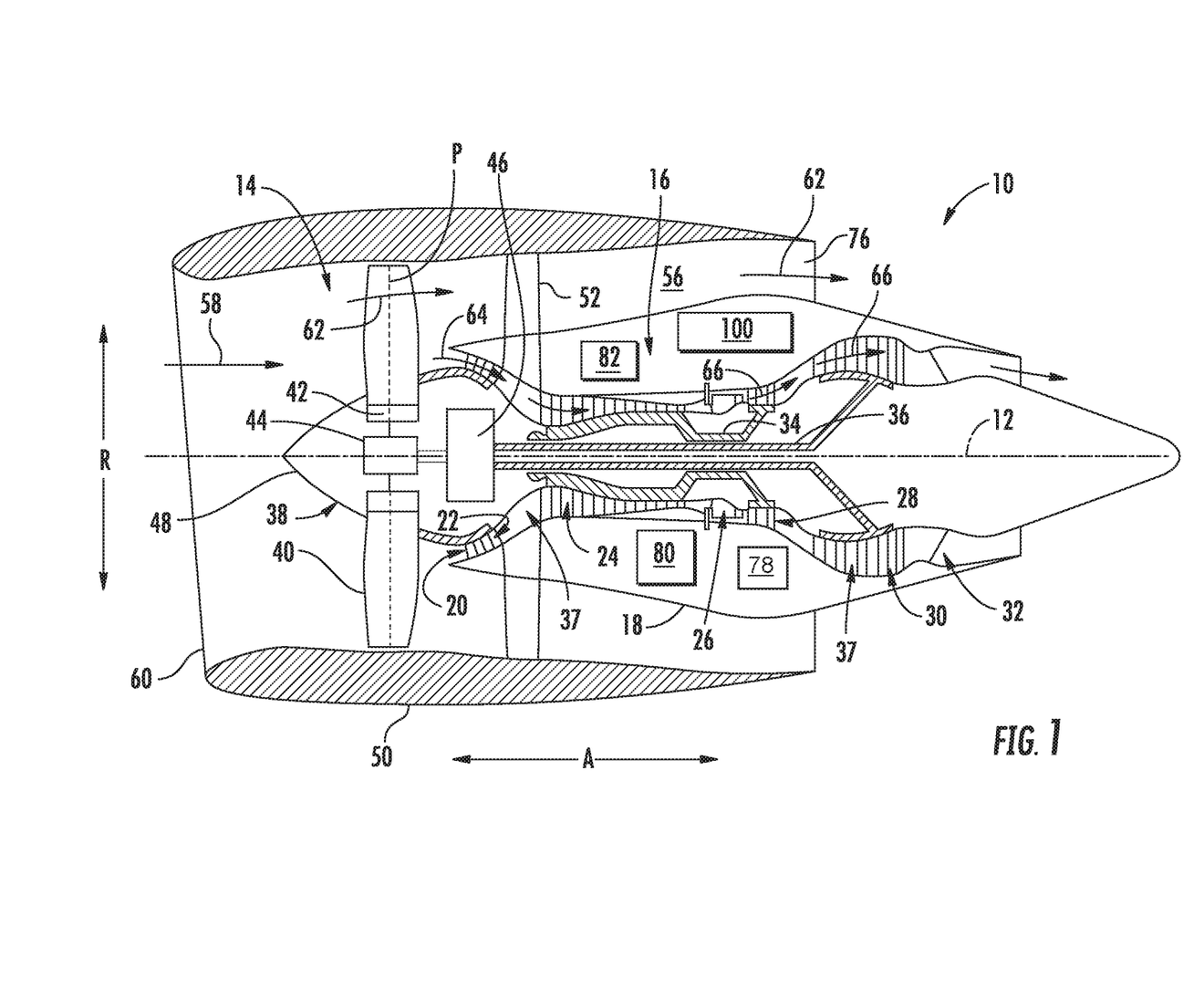
FIG. 1 is a schematic, cross-sectional view of an exemplary gas turbine engine according to various embodiments of the present subject matter.

Referring now to the drawings, wherein identical numerals indicate the same elements throughout the FIGS., FIG. 1 is a schematic, cross-sectional view of anaeronautical gas turbine engine in accordance with an exemplary embodiment of the present disclosure. More particularly, for the embodiment of FIG. 1, the aeronautical gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. In general, the turbofan engine 10 includes a fan section 14 and a turbomachine 16 disposed downstream from the fan section 14.

The exemplary turbomachine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. The compressor section, combustion section 26, turbine section, and exhaust nozzle section 32 together define at least in part a core air flowpath 37 through the turbomachine 16. A high pressure (HP) shaft or spool 34 (or rather a high pressure spool assembly, as described below) drivingly connects the HP turbine 28 to the HP compressor 24. A low pressure (LP) shaft or spool 36 drivingly connects the LP turbine 30 to the LP compressor 22.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal axis 12 by LP shaft 36 across a power gear box 46. The power gear box 46 includes a plurality of gears for stepping down the rotational speed of the LP shaft 36 to a more efficient rotational fan speed.

Referring still to the exemplary embodiment of FIG. 1, the disk 42 is covered by rotatable front hub 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the turbomachine 16. The nacelle 50 is supported relative to the turbomachine 16 by a plurality of circumferentially-spaced outlet guide vanes 52. Moreover, the nacelle 50 extends over an outer portion of the turbomachine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66. Subsequently, the combustion gases 66 are routed through the HP turbine 28 and the LP turbine 30, where a portion of thermal and/or kinetic energy from the combustion gases 66 is extracted.

The combustion gases 66 are then routed through the jet exhaust nozzle section 32 of the turbomachine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust.

Moreover, as is depicted schematically, the exemplary turbofan engine 10 further includes various accessory systems to aid in the operation of the turbofan engine 10. For example, the exemplary turbofan engine 10 further includes a main lubrication system 78 configured to provide a lubricant to, e.g., various bearings and gear meshes in the compressor section, the turbine section, the HP spool 34, the LP spool 36, and the power gear box 46. The lubricant provided by the main lubrication system 78 may increase the useful life of such components and may remove a certain amount of heat from such components. Additionally, the exemplary turbofan engine 10 further includes a compressor cooling air system 80 for providing cooled air to one or more components of the HP compressor 24. The compressor cooling air system 80 will be described in greater detail below. Moreover, it will be appreciated, that although not depicted in FIG. 1, the turbofan engine 10 may further include other systems and subsystems not depicted, such as, for example, hydraulic systems and generator lubrication systems. One or more of these systems/sub-systems may generate heat during operation.

Further, as is also depicted schematically, the exemplary turbofan engine 10 additionally includes an accessory gearbox 82. The accessory gearbox 82 may be mechanically coupled to one or more components of the turbine fan engine 10, such as the HP shaft 34 or LP shaft 36. In such a manner, during certain operations, the accessory gearbox 82 may extract power from the turbomachine 16 to, e.g. power one or more accessory systems, such as one or more of a lubrication system (not shown), the compressor cooling air system 80, etc. Additionally, in other operations, such as during startup operations, the accessory gearbox 82 may provide power to the turbomachine 16 through, e.g., an electric machine (not shown) coupled to the accessory gearbox 82.

Further, still, as is depicted schematically, the exemplary turbofan engine 10 further includes a closed cycle heat engine 100. As will be explained in more detail below, the closed cycle heat engine 100 is generally configured to receive heat from one or more heat sources of the turbomachine 16, and convert such heat to useful work. This useful work may be transferred back into the turbomachine 16 to increase an efficiency of the turbomachine 16, or alternatively, may be provided to any other suitable power sink (e.g., an aircraft within which the turbofan engine 10 is installed, other turbofan engines of a propulsion system of an aircraft within which the turbofan engine 10 is installed, etc.).

It should be appreciated, however, that the exemplary turbofan engine 10 depicted in FIG. 1 is by way of example only, and that in other exemplary embodiments, aspects of the present disclosure may additionally, or alternatively, be applied to any other suitable gas turbine engine. For example, the turbofan engine 10 may not include one or more of the components described above, or, alternatively, may include additional components not described above. Additionally, for example, in other exemplary embodiments, the turbofan engine 10 may instead be any other suitable aeronautical gas turbine engine, such as a turbojet engine, turboshaft engine, turboprop engine, etc., or alternatively may be any gas turbine engine for use in aeroderivative industries, power generation industries, etc. As will be appreciated, the term "aeronautical gas turbine engine" refers generally to any gas turbine engine configured for use in an aircraft for powering such aircraft (i.e., generating thrust).

Figure 2:
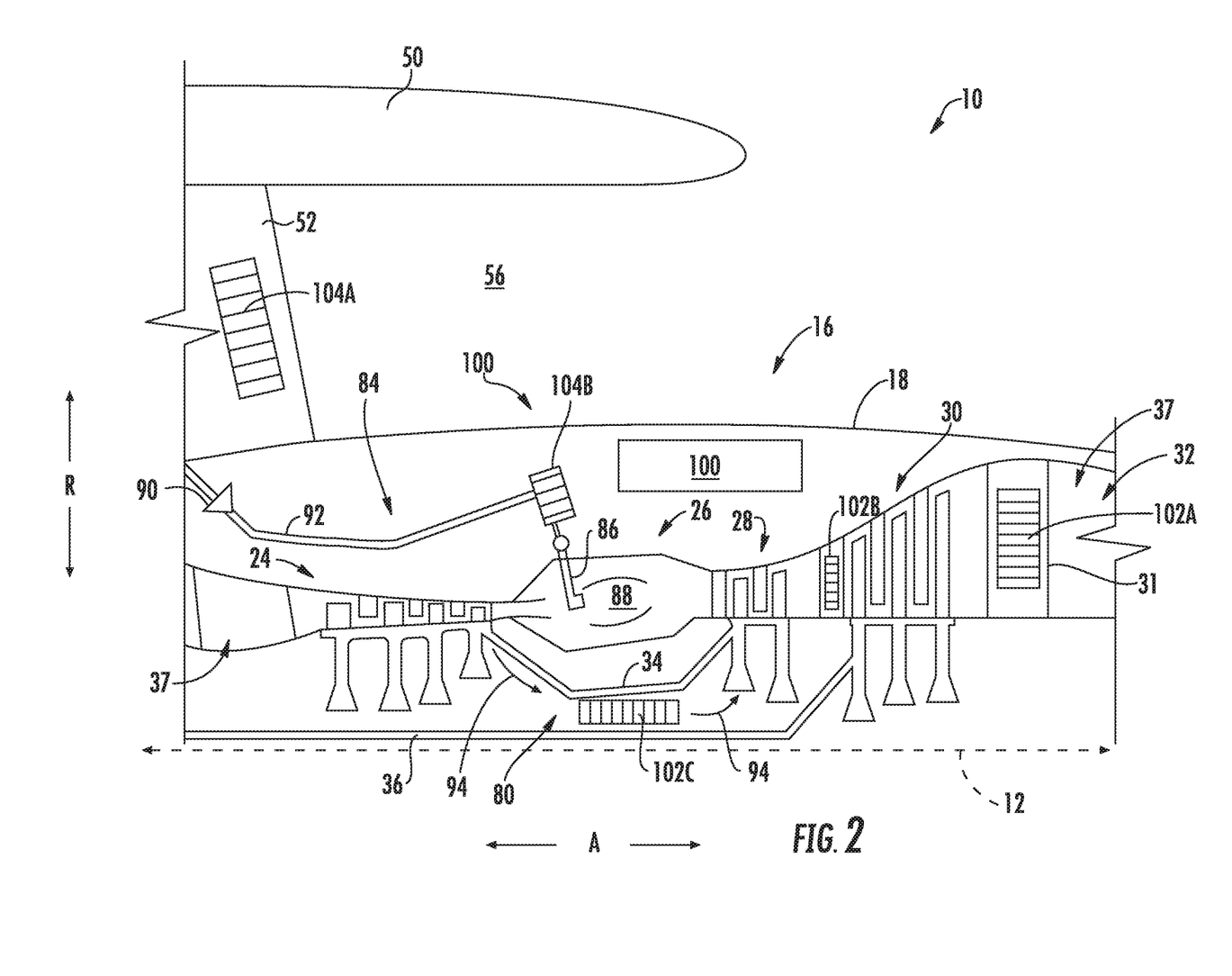
FIG. 2 is a schematic view of a gas turbine engine including a closed cycle heat engine in accordance with an exemplary embodiment of the present disclosure.

Referring now to FIG. 2, a close-up, cross-sectional view of a gas turbine engine including a closed cycle heat engine 100 in accordance with an exemplary aspect of the present disclosure is provided. The gas turbine engine may be configured in a similar manner to the exemplary turbofan engine 10 described above with reference to FIG. 1. Accordingly, the same or similar numbers may refer to same or similar parts.

For example, as is depicted the exemplary gas turbine engine of FIG. 2 generally includes a turbomachine 16 and an outer nacelle 50, with the turbomachine 16 at least partially surrounded by the outer nacelle 50. Moreover, the outer nacelle 50 defines a bypass airflow passage 56 with the turbomachine 16 (i.e., between the outer nacelle 50 and the turbomachine 16), and more specifically, defines the bypass airflow passage 56 between the outer nacelle 50 and an outer casing 18 of the turbomachine 16. Furthermore, the gas turbine engine includes an outlet guide vane 52 extending between the outer nacelle 50 and the turbomachine 16, the outlet guide vane 52 supporting the turbomachine 16 relative to the outer nacelle 50. In such a manner, the gas turbine engine may be referred to as a turbofan engine (similar to the exemplary turbofan engine 10 of FIG. 1).

Additionally, the exemplary turbomachine 16 depicted generally includes a compressor section, a combustion section 26, a turbine section, and an exhaust section 32. The compressor section, combustion section 26, turbine section, and exhaust section 32 together define at least in part a core air flowpath 37. Additionally, the compressor section generally includes a high pressure ("HP") compressor 24, and the turbine section generally includes a low pressure ("LP") turbine 30 and an HP turbine 28. The LP turbine 30 is coupled to, and configured to drive, an LP spool 36, and the HP turbine 28 is coupled to and configured to drive, an HP spool 34. Notably, the HP spool 34 is further coupled to the HP compressor 24, such that the HP turbine 28 may drive the HP compressor 24 through the HP spool 34.

The turbomachine 16 further includes a fuel delivery system 84 for providing a fuel flow to the combustion section 26 of the turbomachine 16. For example, the exemplary fuel delivery system 84 generally includes one or more fuel nozzles 86 configured to provide a mixture of fuel and air to a combustion chamber 88 of the combustion section 26, as well as a fuel pump 90 and a plurality of fuel lines 92. The fuel pump 90 may provide for the fuel flow through the plurality of fuel lines 92 from a fuel source (not shown) to the plurality of fuel nozzles 86. Further, it will be appreciated that in at least certain exemplary embodiments, the fuel delivery system 84 may be used as a heat sink (see discussion below).

Moreover, the exemplary gas turbine engine further includes a plurality of heat exchangers, and as noted above, the closed cycle heat engine 100. More specifically, for the embodiment shown, the gas turbine engine includes a heat source heat exchanger 102 configured to collect heat from the turbomachine 16 during operation (i.e., collect heat from one or more heat sources of the turbomachine 16 during operation) and a heat sink heat exchanger 104 configured to reject heat during operation. In certain exemplary embodiments, as will be discussed in greater detail below, one or both of the heat source heat exchanger 102 and heat sink heat exchanger 104 may be configured as part of the closed cycle heat engine 100.

Notably, it will be appreciated that as used herein, the term "heat source" and "heat sink" as used to describe a heat exchanger refer to typical operation of the heat exchanger with respect to the closed cycle heat engine 100. For example, a heat source heat exchanger 102 refers to a heat exchanger that is generally operable to provide heat to the closed cycle heat engine 100. However, relative to other systems to which it is thermally connected, the heat source heat exchanger 102 may act as a heat sink. Similarly, for example, a heat sink heat exchanger 104 refers to a heat exchanger that is generally operable to remove heat from the closed cycle heat engine 100. However, relative to other systems to which it is thermally connected, the heat sink heat exchanger 104 may act as a heat source.

More particularly, with respect to the embodiment of FIG. 2, the heat source heat exchanger 102 is a first heat source heat exchanger 102A, and the gas turbine engine further includes a second heat source heat exchanger 102B and a third heat source heat exchanger 102C. The first heat source heat exchanger 102A is, for the embodiment shown, a waste heat recovery heat exchanger. More specifically, for the embodiment depicted, the waste heat recovery heat exchanger is positioned to be in thermal communication with the core air flowpath 37 downstream of the turbine section and within the exhaust section 32. More specifically, still, for the embodiment depicted, the waste heat recovery heat exchanger is integrated into an aft strut/outlet guide vane 31 of the exhaust section 32, downstream of the LP turbine 30 of the turbomachine 16 (i.e., downstream of all turbine rotor blades within the turbine section of the gas turbine engine). Accordingly, the waste heat recovery heat exchanger may generally capture heat from a flow of exhaust through the exhaust section 32.

Similarly, for the embodiment depicted, the second heat source heat exchanger 102B is a turbine heat exchanger. The turbine heat exchanger is positioned to be in thermal communication with the core air flowpath 37 downstream of the combustion section 26 and within the turbine section. Extracting heat from the turbine section may, e.g., slow down the engine. Accordingly, it may be beneficial to extract heat from the turbine section during, e.g., certain engine operating modes, such as idle operating modes, descent operating modes, etc.

Further, it will be appreciated that the exemplary gas turbine engine depicted includes a cooling air system 80 (see, also FIG. 1), and the third heat source heat exchanger 102C is configured as a cooling air system heat exchanger. As will be appreciated, the cooling air system 80 may generally provide an airflow 94 from the compressor section to the turbine section, with such airflow 94 being used as cooling air for the turbine section. The cooling air system heat exchanger may remove heat from the airflow 94 from the compressor section prior to such airflow 94 being provided to the turbine section. In such a manner, the cooling air system heat exchanger may reduce a temperature of the airflow 94 being provided to the turbine section, such that the airflow 94 may be used more efficiently as cooling air. Such may allow for the gas turbine engine to operate at higher power levels, and more specifically may allow for the turbine section of the gas turbine engine to accept combustion gases at higher temperatures and/or pressures.

Also for the embodiment depicted, the heat sink heat exchanger 104 is a first heat sink heat exchanger 104A, and the gas turbine engine further includes a second heat sink heat exchanger 104B. The first heat sink heat exchanger 104A is, for the embodiment shown, a bypass airflow heat exchanger integrated into, or coupled to, one or more components positioned in, or otherwise exposed to, the bypass airflow passage 56. More specifically, for the embodiment depicted, the bypass airflow heat exchanger is integrated into, or coupled to, the outlet guide vane 52 of the gas turbine engine. In such a manner, the bypass airflow heat exchanger may reject heat to the airflow through the bypass airflow passage 56 during operation.

Moreover, for the embodiment depicted, the second heat sink heat exchanger 104B is a fuel heat exchanger thermally coupled to the fuel delivery system 84. More specifically, the fuel heat exchanger is thermally coupled to one of the plurality of fuel lines 92 of the fuel delivery system 84 such that the fuel heat exchanger may reject heat to a fuel flow therethrough.

Figure 3:
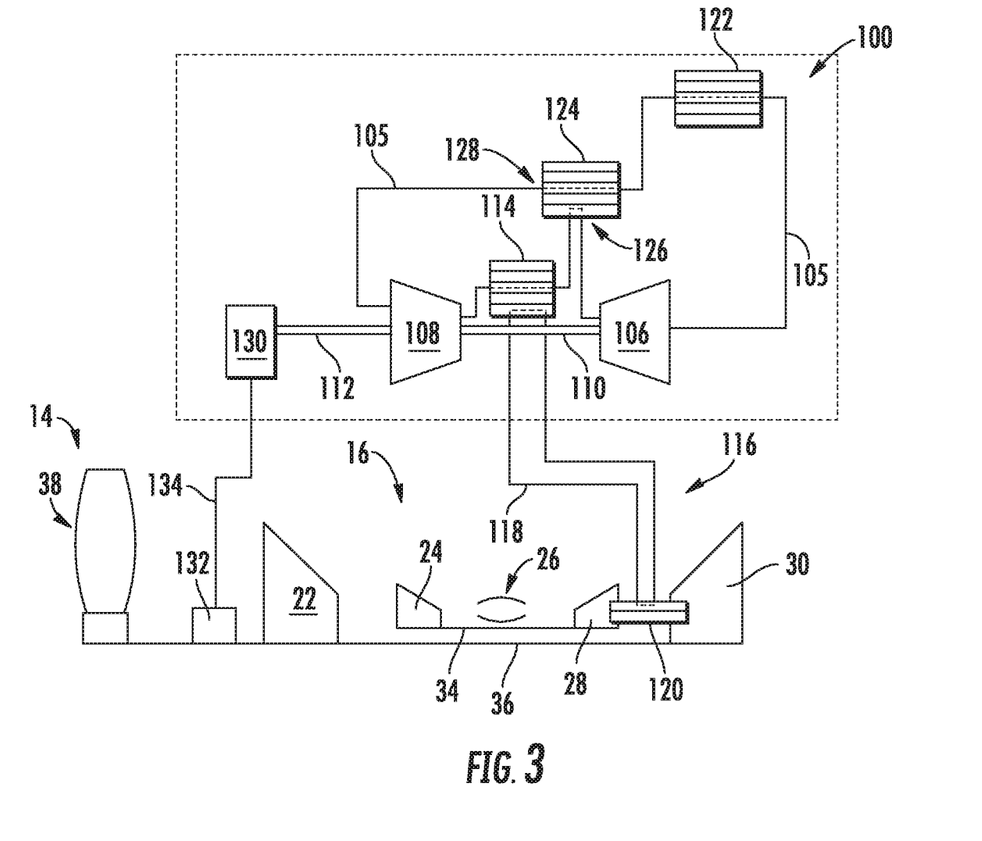
FIG. 3 is a simplified schematic view of a gas turbine engine including a closed cycle heat engine in accordance with an exemplary embodiment of the present disclosure.

Referring now to FIG. 3, operation of a gas turbine engine and closed cycle heat engine 100 in accordance with an exemplary embodiment of the present disclosure will be described. The gas turbine engine depicted schematically in FIG. 3 may be configured in the same manner as one or both of the exemplary gas turbine engines described above with reference to FIGS. 1 and 2.

For example, the exemplary gas turbine engine of FIG. 3 generally includes a fan section 14 and a turbomachine 16, with the turbomachine 16 including a compressor section having an LP compressor 22 and an HP compressor 24; a combustion section 26; and a turbine section including an HP turbine 28 and an LP turbine 30. The turbomachine 16 may further include an exhaust section (not shown; see exhaust section 32 in FIG. 1). The turbomachine 16 further includes a shaft mechanically coupled to a component of the compressor section and a component of the turbine section. More specifically, the turbomachine 16 includes an LP shaft 36 mechanically coupled to the LP compressor 22 and the LP turbine 30, and an HP shaft 34 mechanically coupled to the HP compressor 24 and the HP turbine 28. Notably, the LP shaft 36 is further coupled to and configured for driving a fan 38 of the fan section 14.

Referring particularly to the closed cycle heat engine 100, the closed cycle heat engine 100 generally includes a compressor 106 configured to compress a working fluid and an expander 108 coupled to the compressor 106 for expanding the working fluid compressed by the compressor. In such a manner, the expander 108 may extract work from the working fluid flowing therethrough, as will be explained in more detail below. The closed cycle heat engine 100 additionally includes a plurality of fluid conduits 105 for transferring the working fluid between the various components in the manner described herein.

Notably, the compressor 106 and the expander 108 are coupled mechanically through a heat engine shaft 110 for the embodiment shown. Additionally, the closed cycle heat engine 100 includes an output shaft 112 driven by the expander 108. For example, the output shaft 112 may be directly coupled to the expander 108, the compressor 106, or the heat engine shaft 110.

Further, the closed cycle heat engine 100 includes a primary heat exchanger 114. The primary heat exchanger 114 is in thermal communication with both the turbomachine 16 and the working fluid of the closed cycle heat engine 100. The primary heat exchanger 114 is configured to transfer heat from the turbomachine 16 to the working fluid. More specifically, for the embodiment shown, the primary heat exchanger 114 is in thermal communication with at least one of the turbine section, the exhaust section (see, e.g., exhaust section 32 of FIGS. 1 and 2), a cooling air system 80 (see, e.g., cooling air system 80 of FIGS. 1 and 2) of the gas turbine engine, or other system or sub-system of the gas turbine engine that generates heat (e.g., a main lubrication system 78, see FIG. 1; hydraulics systems, electric machine lubrication systems, etc.).

More particularly, for the embodiment shown, the primary heat exchanger 114 is in thermal communication with the turbine section of the gas turbine engine. More particularly, still, the primary heat exchanger 114 is indirectly in thermal communication with the turbomachine 16, or rather with the turbine section of the turbomachine 16. For the embodiment depicted, the gas turbine engine further includes an intermediate thermal transfer system 116. The intermediate thermal transfer system 116 generally includes a thermal bus 118 and a heat source heat exchanger 120. The heat source heat exchanger 120 of the intermediate thermal transfer system 116 is directly in thermal communication with a heat source of the turbomachine 16 (i.e., the turbine section for the embodiment shown), as well as the thermal bus 118. In such a manner, the intermediate thermal transfer system 116 is configured to transfer heat from the heat source heat exchanger 120 (received from the heat source of the turbomachine 16), through thermal bus 118, to the primary heat exchanger 114 of the closed cycle heat engine 100. In such a manner, the primary heat exchanger 114 may add heat to the closed cycle heat engine 100 (or rather to the working fluid of the closed cycle heat engine) for driving the closed cycle heat engine 100. Notably, the flow of heat exchange fluid from the intermediate thermal transfer system 116 through the primary heat exchanger 114, as well as the flow of working fluid through the primary heat exchanger 114, is depicted schematically through dotted lines. As is indicated, however, there is no mixing of the flows of heat exchange fluid and working fluid for the embodiment depicted.

It will be appreciated, however, that although for the embodiment depicted, the primary heat exchanger 114 is in thermal communication with the turbine section gas turbine engine (i.e., via the intermediate thermal transfer system 116 and heat source heat exchanger 120 thereof—which may be configured in a similar manner as the second heat source exchanger 102B of FIG. 2), in other embodiments, the heat source of the turbomachine 16 may be any other suitable heat source. For example, in other embodiments, the primary heat exchanger 114 may additionally, or alternatively, be in thermal communication with an exhaust section of the gas turbine engine (e.g., the heat source heat exchanger 120 of the intermediate thermal transfer system 116 may be configured in a similar manner to the first heat source exchanger 102A of FIG. 2), a cooling air system 80 of the gas turbine engine (e.g., the heat source heat exchanger 120 of the intermediate thermal transfer system 116 may be configured in a similar manner to the third heat source exchanger 102C of FIG. 2), or any other suitable heat source of the turbomachine 16.

Further, for the exemplary embodiment depicted, the closed cycle heat engine 100 additionally includes an engine sink heat exchanger 122 in thermal communication with a heat sink, as well as the working fluid. The engine sink heat exchanger 122 of the closed cycle heat engine 100 is configured to transfer heat from the working fluid to such heat sink. It will be appreciated that in at least certain exemplary embodiments, the engine sink heat exchanger 122 may be configured as a bypass airflow heat exchanger (e.g., the heat sink heat exchanger 104A of FIG. 2), such that the heat sink is a bypass airflow passage of the gas turbine engine (see, e.g., bypass airflow passage 56 of FIG. 2). In such a manner, the engine sink heat exchanger 122 may be positioned within, or exposed to the bypass airflow passage. Such a configuration may further increase an efficiency of the gas turbine engine by adding heat/energy to the bypass airflow passage (e.g., passage 56; see FIGS. 2 and 3), thereby increasing an amount of thrust generated by an airflow therethrough. It will be appreciated, however, that in other exemplary embodiments, any other suitable heat sink may be utilized for the engine sink heat exchanger 122. For example, in other exemplary embodiments, the engine sink heat exchanger 122 may additionally, or alternatively, be configured as a fuel heat exchanger, such as the exemplary heat exchanger 104B of FIG. 2, or as any other suitable heat exchanger (e.g., any other flowpath through the engine, external surface of the engine, etc.).

Notably, for the embodiment depicted, the primary heat exchanger 114 is positioned downstream of the compressor 106 of the closed cycle heat engine 100 and upstream of the expander 108 of the closed cycle heat engine 100. Additionally, the engine sink heat exchanger 122 is positioned downstream of the expander 108 of the closed cycle heat engine 100 and upstream of the compressor 106 of the closed cycle heat engine 100. It will be appreciated, however, that in other exemplary embodiments, the primary heat exchanger 114 may alternatively be positioned upstream of the compressor 106 and downstream of the engine sink heat exchanger 122. Additionally, or alternatively, in at least certain exemplary embodiments, the closed cycle heat engine may not include the engine sink heat exchanger 122.

Referring still to FIG. 3, the exemplary closed cycle heat engine 100 depicted further includes an intermediate heat exchanger 124 in thermal communication with the working fluid at an upstream location 126 positioned upstream of the expander 108 and at a downstream location 128 positioned downstream of the expander 108. The intermediate heat exchanger 124 is configured to transfer heat from the flow of working fluid at the downstream location 128 to the flow of working fluid at the upstream location 126. More specifically, the upstream location 126 is between the compressor 106 and the primary heat exchanger 114, i.e., downstream of the compressor 106 and upstream of the primary heat exchanger 114, and the downstream location 128 is positioned between the expander 108 and the engine sink heat exchanger 122, i.e., downstream of the expander 108 and upstream of the engine sink heat exchanger 122. As is shown schematically as dotted lines through the intermediate heat exchanger 124, although the flow of working fluid at the upstream location 126 and the flow of working fluid at the downstream location 128 are thermally connected through the intermediate heat exchanger 124, the two flows do not mix for the embodiment depicted.

In such a manner, it will be appreciated that the during operation, relatively cool working fluid may be provided to the compressor 106 whereby its pressure (and temperature) is increased. The working fluid is then provided to the intermediate heat exchanger 124 (at the upstream location 126), whereby the working fluid accepts heat from the downstream location 128, discussed further below. The working fluid is then provided to the primary heat exchanger 114, whereby the working fluid accepts a relatively large amount of heat from the heat source of the turbomachine 16. This high temperature working fluid is then provided to the expander 108, wherein energy is extracted therefrom through an expansion of such working fluid. Notably, the extracted energy from the expander 108 is utilized to drive the compressor 106 (i.e., through the heat engine shaft 110), and further is provided to the output shaft 112 of the closed cycle heat engine 100 for providing useful work to a power sink, as is described in more detail below. After the energy has been extracted from the expansion of the working fluid, the working fluid is provided back to the intermediate heat exchanger 124 (i.e., at the downstream location 128) to transfer at least a portion of the remaining heat in the working fluid to the working fluid at the upstream location 126. The working fluid is then provided to the engine sink heat exchanger 122, whereby a temperature of the working fluid is further reduced. The relatively cool working fluid is then provided back to the compressor 106, and the process repeats.

In such a manner, it will be appreciated that the exemplary closed cycle heat engine 100 described herein defines a hermetically sealed recirculating flowpath through at least the compressor 106, the primary heat exchanger 114, and the expander 108, and more specifically, these components, as well as the intermediate heat exchanger 124, engine sink heat exchanger 122, and the plurality of fluid passages 105. Any suitable working fluid may be utilized. For example, in certain embodiments, the working fluid may be a carbon dioxide. Further, in certain exemplary embodiments, the temperature and pressure of the working fluid may remain above a critical point of the working fluid throughout substantially all of the process cycle. In such a manner, the working fluid may be a supercritical working fluid, such as a supercritical carbon dioxide. However, in other embodiments, other working fluids (supercritical or not) may be utilized (e.g., any suitable organic fluid, refrigerant fluid, etc.).

As stated, the closed cycle heat engine 100 includes the output shaft 112, which for the embodiment shown is configured for adding power to the turbomachine 16. More specifically, for the embodiment shown, the closed cycle heat engine 100 further includes an electric machine 130, with the output shaft 112 being coupled to the electric machine 130 for driving the electric machine 130. In such a manner, the electric machine 130 of the closed cycle heat engine 100 may be configured as an electric generator, such that when the output shaft 112 drives electric machine 130, the electric machine 130 generates electrical power.

Further, for the embodiment depicted, the turbomachine 16 also includes an electric machine 132. The electric machine 132 of the turbomachine 16 is electrically coupled to the electric machine 130 of the closed cycle heat engine 100 (via an electric bus 134 for the embodiment depicted). Accordingly, when the electric machine 130 of the closed cycle heat engine 100 (configured as an electric generator) generates electrical power, the electric power may be provided to the electric machine 132 of the turbomachine 16 to add power to the turbomachine 16. Accordingly, during at least such operations, the electric machine 132 of the turbomachine 16 may be configured as an electric motor. Notably, inclusion of such a system may allow for heat from the turbomachine 16, such as waste heat from the turbomachine 16, to be extracted, converted to useful work by the closed cycle heat engine 100, and then provided back to the turbomachine 16. Such may increase an overall efficiency of the gas turbine engine and turbomachine 16 by converting waste heat to useful work.

In such a manner, it will be appreciated that the gas turbine engine includes a means for receiving power from the output shaft 112 of the closed cycle heat engine 100 and providing at least a portion of such power to the turbomachine 16. More particularly, for the exemplary embodiment of FIG. 3, the means for receiving power from the output shaft 112 and providing at least a portion of such power to the turbomachine 16 is an electric generator (i.e., the electric machine 130 of the closed cycle heat engine 100) and an electric motor (i.e., the electric machine 132 of the turbomachine 16).

It will be appreciated, however, that in other exemplary embodiments, the gas turbine engine and/or closed cycle heat engine 100 may have any other suitable configuration. For example, reference will now be made to FIG. 4, providing a schematic view of a gas turbine engine including a closed cycle heat engine 100 in accordance with another exemplary embodiment of the present disclosure. The exemplary gas turbine engine and closed cycle heat engine 100 of FIG. 4 may be configured in substantially the same manner as the exemplary embodiment described above with reference to FIG. 3. Accordingly, the same numbers generally refer to the same parts.

Figure 4:
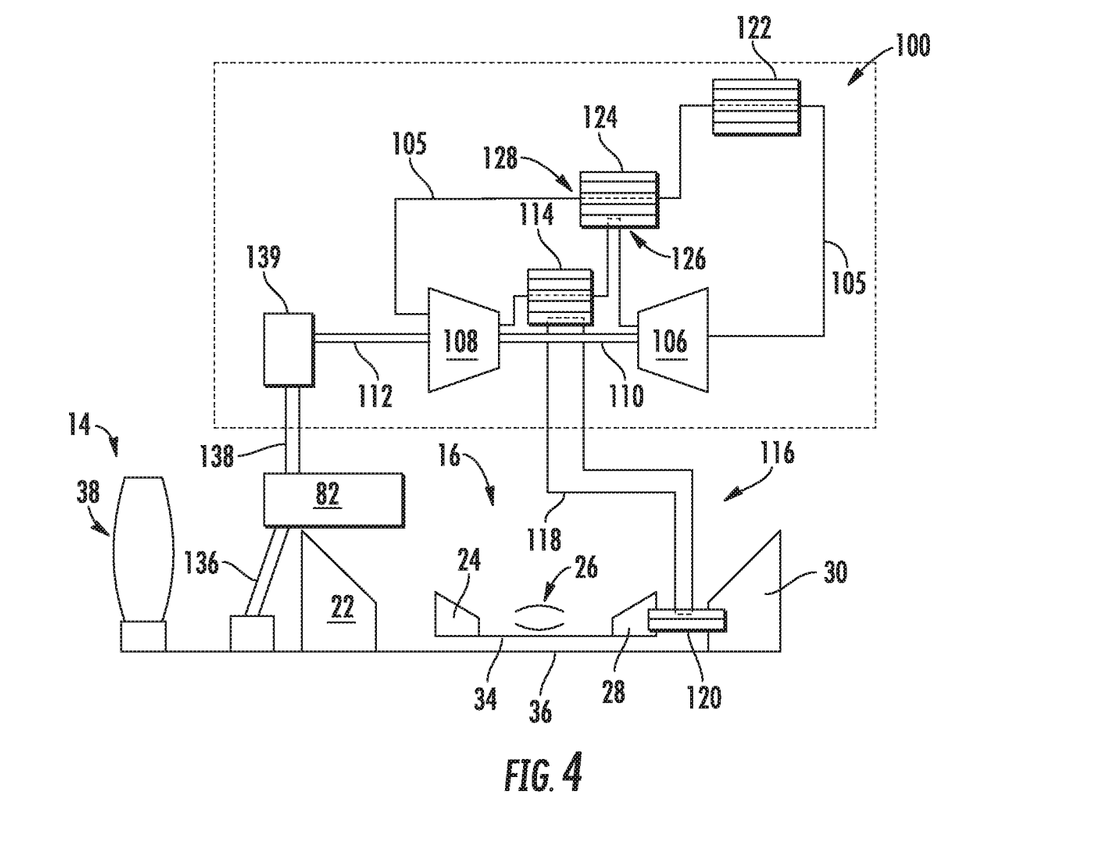
FIG. 4 is a simplified schematic view of a gas turbine engine including a closed cycle heat engine in accordance with another exemplary embodiment of the present disclosure.

For example, the closed cycle heat engine 100 generally includes a compressor 106 configured to compress a working fluid and an expander 108 configured to expand the working fluid. The closed cycle heat engine 100 further includes an output shaft 112 driven by the expander 108. Moreover, the turbomachine 16 generally includes a compressor section having an LP compressor 22 and an HP compressor 24, as well as a turbine section including an HP turbine 28 and LP turbine 30. The HP turbine 28 and HP compressor 24 are coupled through an HP shaft 34, and the LP turbine 30 and LP compressor 22 are coupled through an LP shaft 36.

However, the exemplary gas turbine engine depicted in FIG. 4 further includes an accessory gearbox 82. As noted above with reference to FIG. 1, the accessory gearbox 82 is mechanically coupled to the turbomachine 16, through a drivetrain 136 for the embodiment shown, for either extracting power from the turbomachine 16 (e.g., to power one or more accessory systems of the gas turbine engine) or for providing power to the turbomachine 16 (e.g., during startup operations). For the embodiment depicted, the closed cycle heat engine 100 is configured to add power to the turbomachine 16 by adding power to the accessory gearbox 82. More specifically, for the embodiment depicted, the output shaft 112 of the closed cycle heat engine 100 is mechanically coupled to the accessory gearbox 82 through a mechanical drivetrain 138 (including a gearbox 139) for adding power to the accessory gearbox 82 and thus the turbomachine 16. For example, the closed cycle heat engine 100 may add more power to the accessory gearbox 82 than the accessory gearbox 82 needs, such that the remaining portion of the power provided thereto is applied to the turbomachine 16, or alternatively, the additional power provided to the accessory gearbox 82 by the closed cycle heat engine 100 may reduce an amount of power needed by the turbomachine 16, such that a reduced amount of power is extracted from the turbomachine 16 by the accessory gearbox 82.

Notably, however, in other exemplary embodiments, the closed cycle heat engine 100 may not include the mechanical drivetrain 138 for coupling to the accessory gearbox 82, and instead may include an electric machine 130 driven by the output shaft 112. The electric machine 130 may provide electrical power to a separate electric machine (not shown) mechanically coupled to the accessory gearbox 82 for driving the accessory gearbox 82. In such a manner, the closed cycle heat engine 100 may be coupled to the accessory gearbox 82 (i.e., electrically) to add power to the turbomachine 16, although without a purely mechanical coupling.

In such a manner, it will be appreciated that the gas turbine engine includes a means for receiving power from the output shaft 112 of the closed cycle heat engine 100 and providing at least a portion of such power to the turbomachine 16. More specifically, for the embodiment of FIG. 4, the means for receiving power from the output shaft 112 and providing at least a portion of such power to the turbomachine 16 includes an accessory gearbox 82, with the output shaft 112 of the closed cycle heat engine 100 being coupled, or rather mechanically coupled for the embodiment shown, to the accessory gearbox 82 and the accessory gearbox 82 being mechanically coupled to one or more components of the turbomachine 16 (i.e., the LP shaft 36 for the embodiment of FIG. 4).

Furthermore, it should be appreciated that in other exemplary embodiments of the present disclosure, the closed cycle heat engine 100 may have still other suitable configurations. For example, referring now briefly to FIG. 5, a closed cycle heat engine 100 in accordance with yet another exemplary embodiment of the present disclosure is provided. The exemplary embodiment of FIG. 5 may be configured in substantially the same manner as exemplary embodiment of FIG. 4. Accordingly, the same numbers refer generally to the same part.

Figure 5:
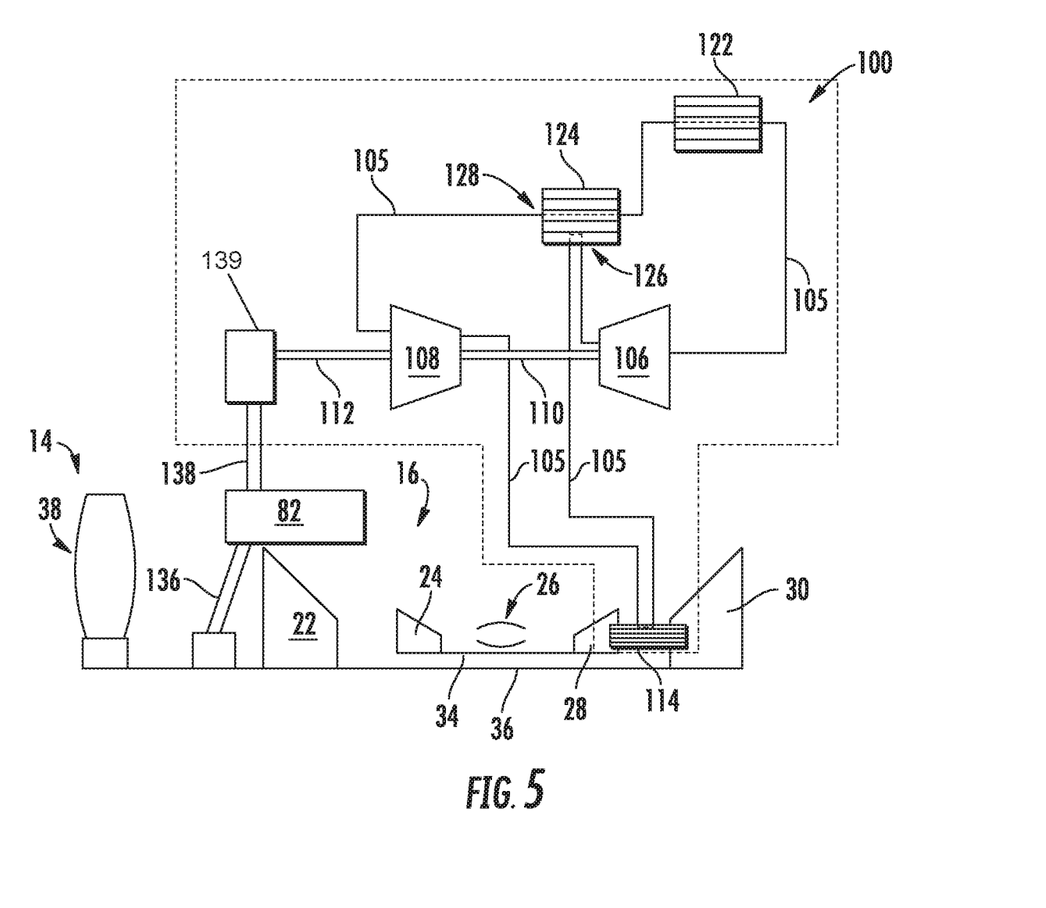
FIG. 5 is a simplified schematic view of a gas turbine engine including a closed cycle heat engine in accordance with yet another exemplary embodiment of the present disclosure.

For example, the turbomachine 16 generally includes a compressor section having an LP compressor 22 and an HP compressor 24, as well as a turbine section including an HP turbine 28 and LP turbine 30. The HP turbine 28 and HP compressor 24 are coupled through an HP shaft 34, and the LP turbine 30 and LP compressor 22 are coupled through an LP shaft 36. Moreover, the closed cycle heat engine 100 generally includes a compressor 106 configured to compress a working fluid and an expander 108 configured to expand the working fluid. The closed cycle heat engine 100 further includes an output shaft 112 driven by the expander 108. Additionally, the closed cycle heat engine 100 includes a primary heat exchanger 114 in thermal communication with the turbomachine 16 and the working fluid, with the primary heat exchanger 114 being configured to transfer heat from the turbomachine 16 to the working fluid.

However, for the exemplary embodiment of FIG. 5, the primary heat exchanger 114 is not in thermal communication with the turbomachine 16 through an intermediate thermal transfer system 116 (see FIG. 3), and instead is directly in thermal communication with the turbomachine 16. More specifically, for the embodiment of FIG. 5, the primary heat exchanger 114 is directly in thermal communication with at least one of the turbine section of the turbomachine 16, the exhaust section of the turbomachine 16, or a cooling air system 80 of the turbomachine 16 (see FIG. 2). For example, the exemplary primary heat exchanger 114 may be configured in accordance with one or more of the exemplary heat source heat exchangers 102A, 102B, or 102C of FIG. 2. Particularly for the embodiment of FIG. 5, the primary heat exchanger 114 is configured as a turbine section heat exchanger (e.g., similar to the exemplary heat exchanger 102B of FIG. 2), such that the primary heat exchanger 114 is directly in thermal communication with the turbine section of the turbomachine 16.

Further, still, it should be appreciated that in still other exemplary embodiments of the present disclosure, the closed cycle heat engine 100 may have other suitable configurations. For example, referring now briefly to FIG. 6, a closed cycle heat engine 100 in accordance with yet another exemplary embodiment of the present disclosure is provided. The exemplary embodiment of FIG. 6 may be configured in substantially the same manner as one or more of the exemplary embodiments of FIGS. 3 through 5, above. Accordingly, the same numbers refer generally to the same part.

For example, the turbomachine 16 generally includes a compressor section having an LP compressor 22 and an HP compressor 24, as well as a turbine section including an HP turbine 28 and LP turbine 30. The HP turbine 28 and HP compressor 24 are coupled through an HP shaft 34, and the LP turbine 30 and LP compressor 22 are coupled through an LP shaft 36. Additionally, the exemplary gas turbine engine depicted in FIG. 6 further includes an accessory gearbox 82. The accessory gearbox 82 is mechanically coupled to the turbomachine 16, through a drivetrain 136 for the embodiment shown, for either extracting power from the turbomachine 16 (e.g., to power one or more accessory systems of the gas turbine engine) or for providing power to the turbomachine 16 (e.g., during startup operations). For the embodiment depicted, the closed cycle heat engine 100 is configured to add power to the turbomachine 16 by adding power to the accessory gearbox 82, as will be discussed below.

Figure 6:
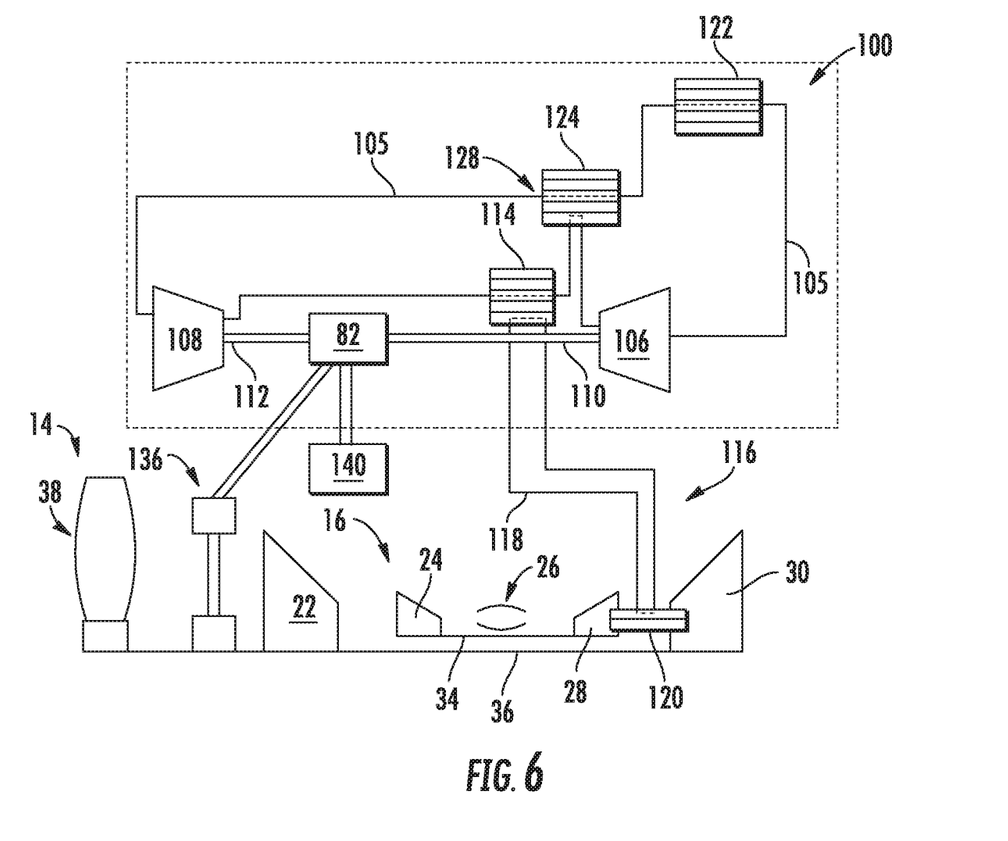
FIG. 6 is a simplified schematic view of a gas turbine engine including a closed cycle heat engine in accordance with still another exemplary embodiment of the present disclosure.

Moreover, the closed cycle heat engine 100 generally includes a compressor 106 configured to compress a working fluid and an expander 108 configured to expand the working fluid. Further, the closed cycle heat engine 100 includes a heat engine shaft 110 coupled to the compressor 106 and an output shaft 112 coupled to the expander 108.

However, for the exemplary embodiment of FIG. 6, the engine shaft 110 does not directly mechanically couple the compressor 106 to the expander 108, and instead the compressor 106 is coupled to, and driven by, the expander 108 through the accessory gearbox 82. More specifically, the heat engine shaft 110 couples the compressor 106 to a first gear of the accessory gearbox 82, and the output shaft 112 mechanically couples the expander 108 to a second gear of the accessory gearbox 82. In such a manner, the expander 108 may add power to the accessory gearbox 82 through the output shaft 112 during operation of the heat engine 100, and the accessory gearbox 82 may drive/power the compressor 106 through the heat engine shaft 110 during operation of the heat engine 100. Therefore, it will be appreciated that for the embodiment depicted, the compressor 106 is mechanically coupled to the expander 108 though the accessory gearbox 82. Such may further allow for the compressor 106 to be rotated at a different speed than the expander 108 (allowing the two components to further be designed for different ideal speeds for increased efficiency).

Further, for the embodiment depicted, the accessory gearbox 82 is further mechanically coupled to an electric machine 140. The electric machine 140 is mechanically coupled to a third gear of the accessory gearbox 82. Such may allow for any excess power from the expander 108 provided to the accessory gearbox 82 to be at least partially (or fully) transferred to the electric machine 140 to generate additional electric power. Notably, however, any other suitable component in addition to, or in the alternative to, the electric machine 140 may be coupled to another gear of the accessory gearbox to receive excess power from the expander 108.

Furthermore, as is also depicted, the accessory gearbox 82 is further mechanically coupled to the turbomachine 16 through a mechanical drivetrain 138 for adding power to the turbomachine 16. For example, the expander 108 of the closed cycle heat engine 100 may add more power to the accessory gearbox 82 than the accessory gearbox 82 needs to power the compressor 106 and other accessory systems, such that the remaining portion of the power provided thereto is applied to the turbomachine 16, or alternatively, the additional power provided to the accessory gearbox 82 by the closed cycle heat engine 100 may reduce an amount of power needed by the turbomachine 16, such that a reduced amount of power is extracted from the turbomachine 16 by the accessory gearbox 82.

In such a manner, it will be appreciated that the gas turbine engine includes a means for receiving power from the output shaft 112 of the closed cycle heat engine 100 and providing at least a portion of such power to the turbomachine 16. More specifically, for the embodiment of FIG. 6, the means for receiving power from the output shaft 112 and providing at least a portion of such power to the turbomachine 16 includes an accessory gearbox 82, with the output shaft 112 of the closed cycle heat engine 100 being coupled, or rather mechanically coupled for the embodiment shown, to the accessory gearbox 82 and the accessory gearbox 82 being mechanically coupled to one or more components of the turbomachine 16 (i.e., the LP shaft 36 for the embodiment of FIG. 6). It will be appreciated, however, that in other exemplary embodiments, any other suitable means for receiving power from the output shaft 112 of the closed cycle heat engine 100 and providing at least a portion of such power to the turbomachine 16 may be provided. For example, in other exemplary embodiments, the means for receiving power from the output shaft 112 of the closed cycle heat engine 100 and providing at least a portion of such power to the turbomachine 16 may include a pneumatic system for transferring such power.

Inclusion of a closed cycle heat engine in a gas turbine engine in accordance with one or more exemplary embodiments the present disclosure may result in an overall more efficient gas turbine engine. More specifically, utilizing a closed cycle heat engine in accordance with one or more of the above exemplary embodiments may allow for the gas turbine engine to more effectively use heat generated therein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An aeronautical gas turbine engine comprising:
   a turbomachine including a compressor section, a combustion section, a turbine section, and an exhaust section in serial flow order, wherein the turbomachine defines an axis and a radial direction;
   an aeronautical propulsor driven at least in part by the turbomachine; and
   a closed cycle heat engine defining an axis offset from the axis of the turbomachine along the radial direction of the turbomachine, the closed cycle heat engine comprising:
   a compressor configured to compress a working fluid, wherein the working fluid is a supercritical fluid;
   a primary heat exchanger in thermal communication with the turbomachine and the working fluid, the primary heat exchanger configured to transfer heat from the turbomachine to the working fluid;
   an expander coupled to the compressor for expanding the working fluid;
   a heat engine shaft extending between the expander and the compressor; and
   an output shaft driven by the expander.

2. The gas turbine engine of claim 1, wherein the closed cycle heat engine further comprises an engine sink heat exchanger in thermal communication with a heat sink and the working fluid, the engine sink heat exchanger configured to transfer heat from the working fluid to the heat sink.

3. The gas turbine engine of claim 2, further comprising:
   an outer nacelle at least partially surrounding the turbomachine and defining at least in part a bypass airflow path, wherein the heat sink is the bypass airflow path and the engine sink heat exchanger is positioned within, or exposed to, the bypass airflow path.

4. The gas turbine engine of claim 2, wherein the primary heat exchanger is positioned downstream of the compressor of the closed cycle heat engine and upstream of the expander of the closed cycle heat engine, and wherein the engine sink heat exchanger is positioned downstream of the expander of the closed cycle heat engine and upstream of the compressor of the closed cycle heat engine.

5. The gas turbine engine of claim 1, wherein the closed cycle heat engine further comprises an intermediate heat exchanger in thermal communication with the working fluid at an upstream location and at a downstream location, wherein the upstream location is positioned upstream of the expander and the downstream location positioned downstream of the expander, the intermediate heat exchanger configured to transfer heat from the working fluid at the downstream location to the working fluid at the upstream location.

6. The gas turbine engine of claim 5, wherein the upstream location is between the compressor and the primary heat exchanger.

7. The gas turbine engine of claim 1, wherein the turbomachine further comprises a cooling air system for providing cooling airflow from the compressor section to the turbine section and a main lubrication system, and wherein the primary heat exchanger is in thermal communication with at least one of the turbine section, the exhaust section, the cooling air system, or the main lubrication system.

8. The gas turbine engine of claim 7, wherein the primary heat exchanger is directly in thermal communication with at least one of the turbine section, the exhaust section, the cooling air system, or the main lubrication system.

9. The gas turbine engine of claim 1, further comprising:
an intermediate thermal transfer system comprising a thermal bus and a heat source heat exchanger, wherein the heat source heat exchanger of the intermediate thermal transfer system is directly in thermal communication with a heat source of the turbomachine and the thermal bus, and wherein the intermediate thermal transfer system is configured to transfer heat from the heat source heat exchanger, through the thermal bus, to the primary heat exchanger of the closed cycle heat engine.

10. The gas turbine engine of claim 1, wherein the output shaft of the closed cycle heat engine is configured for adding power to the turbomachine.

11. The gas turbine engine of claim 10, further comprising:
an accessory gearbox mechanically coupled to one or more components of the turbomachine, wherein the output shaft of the closed cycle heat engine is mechanically coupled to the accessory gearbox for adding power to the accessory gearbox.

12. The gas turbine engine of claim 10, wherein the closed cycle heat engine further comprises an electric machine, wherein the output shaft is drivingly coupled to the electric machine for driving the electric machine and generating electrical power.

13. The gas turbine engine of claim 1, wherein the closed cycle heat engine defines a hermetically sealed recirculating flowpath through at least the compressor, the primary heat exchanger, and the expander.

14. The gas turbine engine of claim 1, wherein the supercritical fluid is a supercritical carbon dioxide.

15. An aeronautical gas turbine engine comprising:
a turbomachine, wherein the turbomachine defines an axis and a radial direction;
a closed cycle heat engine defining an axis offset from the axis of the turbomachine along the radial direction of the turbomachine, the closed cycle heat engine comprising
a compressor configured to compress a working fluid, wherein the working fluid is a supercritical fluid;
a primary heat exchanger in thermal communication with the turbomachine and the working fluid, the primary heat exchanger configured to transfer heat from the turbomachine to the working fluid;
an expander coupled to the compressor for expanding the working fluid; and
an output shaft driven by the expander; and
a means for receiving power from the output shaft of the closed cycle heat engine and providing at least a portion of such power to the turbomachine.

16. The gas turbine engine of claim 15, wherein the means for receiving power from the output shaft and providing at least a portion of such power to the turbomachine is an accessory gearbox, wherein the output shaft of the closed cycle heat engine is mechanically coupled to the accessory gearbox, and wherein the accessory gearbox is mechanically coupled to one or more components of the turbomachine.

17. The gas turbine engine of claim 15, wherein the turbomachine comprises a compressor section, a turbine section, and a shaft mechanically coupled to a component of the compressor section and a component of the turbine section, wherein the means for receiving power from the output shaft and providing at least a portion of such power to the turbomachine is an electric generator and an electric motor, wherein the electric generator is configured to be driven by the output shaft of the closed cycle heat engine, and wherein the electric motor is mechanically coupled to the shaft and electrically coupled to the electric generator for adding power to the shaft using electrical power received from the electric generator.

18. The gas turbine engine of claim 15, wherein the closed cycle heat engine further comprises an engine sink heat exchanger in thermal communication with a heat sink and the working fluid, the engine sink heat exchanger configured to transfer heat from the working fluid to the heat sink.

19. The gas turbine engine of claim 15, wherein the gas turbine engine is an aeronautical gas turbine engine.

20. An aeronautical gas turbine engine comprising:
a turbomachine including a compressor section, a combustion section, a turbine section, and an exhaust section in serial flow order, wherein the turbine section comprises a low pressure turbine and a high pressure turbine;
an aeronautical propulsor driven at least in part by the turbomachine; and
a closed cycle heat engine comprising:
a compressor configured to compress a working fluid;
a primary heat exchanger in thermal communication with the turbomachine and the working fluid, the primary heat exchanger configured to transfer heat from the turbomachine to the working fluid, the primary heat exchanger is located within the turbine section of the turbomachine at a location upstream of the low pressure turbine and downstream of the high pressure turbine;

an expander coupled to the compressor for expanding the working fluid;
a heat engine shaft extending between the expander and the compressor; and
an output shaft driven by the expander.

* * * * *